3,007,923
PROCESS FOR THE FLUORINATION OF 9β,11β-EPOXY AND 5α,6α-EPOXY STEROIDS

Georges Muller, Nogent sur Marne, Roland Bardoneschi, Tremblay-les-Gonesses, and Jean Jolly, Fontenay sur Bois, France, assignors to Les Laboratoires Francais de Chimiotherapie, Paris, France, a corporation of France
No Drawing. Filed Jan. 12, 1960, Ser. No. 1,871
Claims priority, application France Jan. 22, 1959
7 Claims. (Cl. 260—239.55)

The present invention relates to a fluorination process and, more particularly, a novel process for the fluorination of 9β,11β-epoxy or 5α,6α-epoxy steroids with the aid of hydrofluoric acid whereby 9α-fluoro-11β-hydroxy- or 6β-fluoro-5α-hydroxysteroids are obtained.

It is known as described by Fried and Sabo (J. Am. Chem. Soc. 76, 1455, 1954) that 9α-fluoro-11β-hydroxy steroids having glucocorticoidal activity can be prepared by the action of hydrofluoric acid in chloroform solution free of ethanol on the corresponding 9β,11β-epoxy compound. The initial process producing yields in the order of 50% was thereafter improved by Hirschman et al. (J. Am. Chem. Soc., 78, 4957, 1956) who recommended the addition of a certain quantity of a Lewis base to the reaction medium, and particularly of tetrahydrofuran with the attainment of yields in the range of 65 to 75%. This process, however, proved not generally feasible for commercial production because of the critical limitation that the molecular ratio of the hydrofluoric acid to the tetrahydrofuran was in excess of 0.4. It was found that where the ratio was exceeded, the reaction was inhibited and commercially acceptable yields could not be realized. Another disadvantage of this process is the necessity for maintaining excessively low temperatures between minus 30 and minus 60 degrees centigrade.

It is an object of the present invention to avoid the aforementioned disadvantages by providing an improved process of general application for the fluorination of 9β,11β-epoxy or 5α,6α-epoxy steroids to obtain the corresponding fluoro hydrins.

It is a further object of the invention to obtain a reagent mixture of anhydrous hydrofluoric acid in dimethyl formamide and a process for producing the same.

It is a still further object of the invention to obtain novel fluorohydrins of steroids of the androstane and pregnane series such as;

(a) 9α-fluoro-3β,11β,17β-trihydroxy-5α-androstane
(b) 9α - fluoro - 3β,17β - diacetoxy - 11β - hydroxy - 5α-androstane
(c) 3,20-bis-ethylene-ketal of 6β-fluoro-5α,17α-dihydroxy-pregnane-3,11,20-trione These and further objects of our invention will become more apparent as the description thereof proceeds.

In accordance with the process of the present invention, 9α-fluoro-11β-hydroxy or 6β-fluoro-5α-hydroxy steroids are prepared in a straight forward manner by reacting anhydrous hydrofluoric acid in a dimethylformamide medium with the corresponding 9β,11β-epoxy or 5α,6α-epoxy steroidal starting materials. Among the suitable starting materials there may be named the epoxy derivative of pregnanes, such as 3,20-bis-ethylene-ketal of 17α-hydroxy-pregnane-3,11,20-trione; pregnenes such as progesterone; pregnadienes such as 17α-hydroxy-16α-methyl-$\Delta^{1,4}$-pregnadiene-3,20-dione, 21-acetoxy-17α-hydroxy-16α-methyl-$\Delta^{1,4}$-pregnadiene-3,20-dione and 17α,21-dihydroxy-$\Delta^{1,4}$-pregnadiene-3,20-dione; androstanes such as 3β,17β-dihydroxy-5α-androstane and 3β,17β-diacetoxy-5α-androstane and androstenes.

It has been found that fluorination effected with anhydrous hydrofluoric acid dissolved in dimethylformamide at temperatures between about −10° and about 10° C. is preferably conducted using hydrofluoric acid in excess of the steroid reactant although varying amounts may be employed. An amount of dimethylformamide about equal in volume to the amount of liquefied, anhydrous hydrofluoric acid is advantageously employed although the amount of dimethylformamide may be more or less than the hydrofluoric acid.

The reaction can take place either by dissolving anhydrous hydrofluoric acid in dimethylformamide at a low temperature and introducing the epoxy steroid right away to effect the fluorination at temperatures between −10 and +10° C., or, more advantageously for industrial utilization, by dividing the reaction into two steps of preparing the fluorination reagent first by introducing the anhydrous hydrofluoric acid into the dimethylformamide at temperatures between 40° C. and 60° C. and thereafter cooling the mixture and introducing the epoxy steroid.

A perfectly stable fluorination reagent is thus obtained which may be stored and which is available for fluorination at any time.

The process for the preparation of this reagent preferably consists of introducing the anhydrous hydrofluoric acid into the dimethylformamide at a temperature between +40 and +60° C. In order to carry out the fluorination, the subsequent procedure is the same as that described above, namely introducing the 9β,11β-epoxy and the 5α,6α-epoxy steroids into the cooled solution of the reagent.

The novel process of the invention presents the additional advantage of being expeditiously executed by virtue of the very high solubility of the epoxy steroidal starting materials in the dimethylformamide reaction medium. Moreover, the reaction can be performed at temperatures which can be easily attained with readily available cooling apparatus. It presents the additional advantage of yielding non-resinous reaction products from which it is possible to isolate the final products rapidly and in a relatively pure form.

The following examples illustrate the application of the above-described process to a few epoxy steroids without imposing any limit whatsoever upon the present invention. The temperatures are given in ° C.

EXAMPLE 1

*Preparation of 9α-fluoro-11β,17α-dihydroxy-16α-methyl-$\Delta^{1,4}$-pregnadiene-3,20-dione*

15 cc. of liquified anhydrous hydrofluoric acid are added very slowly at a temperature of −10° C. to 15 cc. of dimethylformamide and to the resulting mixture is added with agitation 5 gm. of 9β,11β-epoxy-17α-hydroxy-16α-methyl-$\Delta^{1,4}$-pregnadiene - 3,20 - dione (melting point=253° C.). The steroid dissolves, giving a reddish color to the solution. The reaction mixture is allowed to stand at 0° and −5° C. After 15 hours it is then poured into a mixture of 750 gm. of water and ice containing 75 gms. of sodium bicarbonate. The mixture is then vacuum filtered to give a filter cake which is washed with water and dried at 100° C., yielding 5 gm. of a crude product. This fluorinated product is contaminated with a small amount of the starting material. The loss of steroid material does not amount to more than 5%. The crude product is recrystallized from methylene chloride after passing the methylene chloride solution through charcoal, yielding 3.72 gms. (yield; 71%) of colorless, pure 9α-fluoro-11β,17α-dihydroxy - 16α - methyl-$\Delta^{1,4}$-pregnadiene-3,20-dione having a melting point of 285° C. The mother liquor, upon distillation to dryness, leaves a residue which is dissolved in ether and then dried. 0.89 gm. (18%) of the epoxide starting material is recovered and may be recycled in the above described manner.

This compound may be acetoxylated in the 21 position by conventional methods in order to yield 21-acetoxy-9α-fluoro - 11β,17α - dihydroxy-16α-methyl-Δ$^{1,4}$-pregnadiene-3,20-dione (hexadecadrol).

The starting epoxy pregnadiene was prepared as shown in the commonly assigned, copending U.S. application Serial No. 861,783, filed December 18, 1958. 3α,17α-dihydroxy-16α-methyl-pregnane-11,20-dione was oxidized to 17α-hydroxy-16α-pregnane-3,11,20-trione which was dibrominated in the 2 and 4 positions and then dehydrobrominated to form 17α-hydroxy-16α-methyl-Δ$^{1,4}$-pregnadiene-3,11,20-trione. The latter was transformed into its 3,20-disemicarbazone, reduced in the 11-position to a hydroxyl group, hydrolyzed to remove the semicarbazone groups, dehydrated in the 11-position to form a double bond, treated to form the corresponding 9α-bromo-11β-hydroxy bromohydrin and forming the 9β,11β-epoxide.

EXAMPLE 2

*Preparation of 21-acetoxy-9α-fluoro-11β,17α-dihydroxy-16α-methyl-Δ$^{1,4}$-pregnadiene-3,20-dione (hexadecadrol)*

1.5 cc. of dimethylformamide and 1.5 cc. of anhydrous hydrofluoric acid are admixed as described in Example 1, and treated with 480 mgm. of 9β,11β-epoxy-17α-hydroxy-21-acetoxy-16α-methyl-Δ$^{1,4}$-pregnadiene-3,20-dione (prepared according to E. P. Oliveto et al., J. Am. Chem. Soc., 80, 44331, 1958). The steroid dissolves in about 15 minutes. The reaction mixture is shaken for two hours at a temperature between 0° and +5° C., and then poured into 75 cc. of water containing in suspension, 7.5 gms. of sodium bicarbonate. The mixture is vacuum filtered, the filter cake washed and then dried at 100° C., yielding 460 mgm. of crude hexadecadrol contaminated with a small amount of the starting material. A single recrystallization from methylene chloride yields 370 mgm. of the pure produce having a melting point of 170° C. and 229° C. The mother liquor yields 62 mgm. of the starting material, and a remainder constituting a mixture of starting and final materials with little other contamination.

EXAMPLE 3

*Preparation of 9α-fluoro-11β,17α,21-trihydroxy-Δ$^{1,4}$-pregnadiene-3,20-dione*

1.5 cc. of dimethylformamide and 1.5 cc. of anhydrous hydrofluoric acids are admixed as described in Example 1 and then 500 mgm. of 9β,11β-epoxy-17α,21-dihydroxy-Δ$^{1,4}$-pregnadiene-3,20-dione (melting point=254° C.) prepared by saponification of the 21-acetate of 9β,11β-epoxy - 17α,21-dihydroxy-Δ$^{1,4}$-pregnadiene-3,20-dione described by Fried et al. (J.A.C.S., vol. 77, 1955, p. 4181) are added at a temperature of —5° C. The steroid dissolves very slowly. At the end of 3 hours the reaction mixture is poured into an aqueous bicarbonate solution at —5° C. The mixture is vacuum filtered and the filter cake is washed and dried yielding 490 mgm. of 9α-fluoro-11β,17α,21-trihydroxy-Δ$^{1,4}$-pregnadiene-3,20-dione (93% yield) melting at about 300° C. (unchanged after recrystallization from acetone) and having a specific rotation of $[α]_D^{20}$=+20° (c.=0.5% in dioxan). The mother liquor contains a small quantity of the starting epoxide material.

EXAMPLE 4

*Preparation of 9α-fluoro-3β,11β,17β-trihydroxy-5α-androstane*

1.5 cc. of dimethylformamide and 1.5 cc. of anhydrous hydrofluoric acid are admixed as described in Example 1, and then 350 mgm. of 9β,11β-epoxy-3β,17β-dihydroxy-5α-androstane are added at 0° C. with constant stirring. The starting material dissolves slowly and the fluorinated steroid crystallizes out even before the solution is completed. The reaction mixture is allowed to stand for 3 hours at 0° C. and then poured into an aqueous solution of bicarbonate. The mixture is vacuum filtered and the filter cake is washed and dried, yielding 260 mgm. of 9α-fluoro-3β,11β,17β-trihydroxy - 5α - androstane, melting point 237° C.

After recrystallization from a mixture of ethyl acetate and ether the product melts at 244° C. and has a specific rotation of $[α]_D^{20}$=+14° (c.=0.5% in dioxane).

*Analysis.*—C$_{19}$H$_{31}$O$_3$F; molecular weight 326.44. Calculated: C, 69.9%, 9.6%, F, 5.8%. Found. 69.9%, 9.7%, 5.7%.

This compound is not described in the literateure and is useful as an intermediate in the synthesis of 9α-fluoro-17β - hydroxy-17α-methyl-Δ$^4$-androstene-3,11-dione, which is a product having androgenic and anabolistic activity, according to the following reaction scheme:

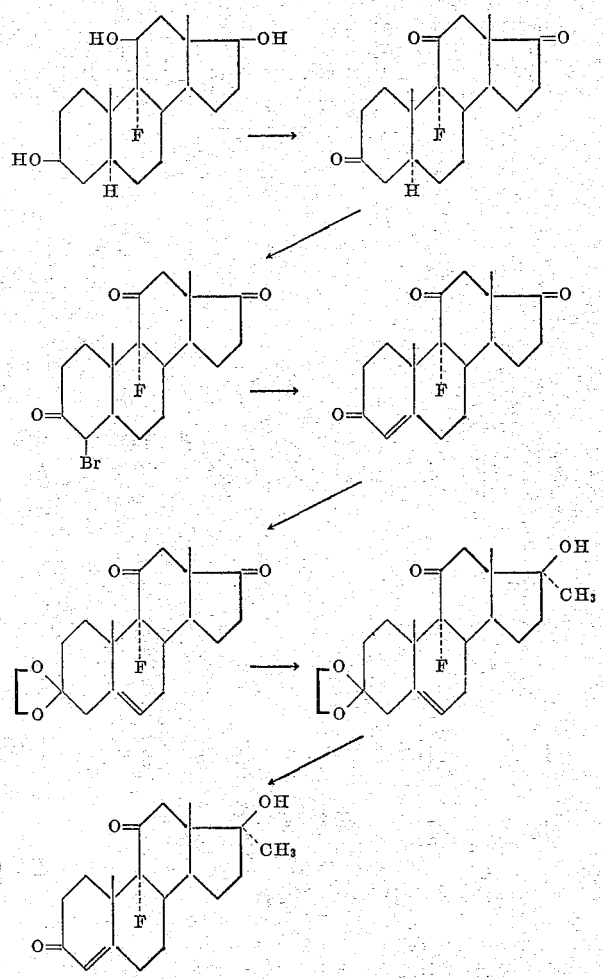

EXAMPLE 5

*Preparation of 9α-fluoro-3β,17β-diacetoxy-11β-hydroxy-5α-androstane*

1.5 cc. of dimethylformamide and 1.5 cc. of anhydrous hydrofluoric acid are admixed as described in Example 1 and then 330 mgm. of 9β,11β-epoxy-3β,17β-diacetoxy-5α-androstane are added. The steroid is slightly soluble. The reaction mixture after being allowed to stand for 16 hours at 0° C., is poured into an aqueous solution of sodium bicarbonate. The mixture is vacuum filtered and the filter cake washed and dried, yielding 300 mgm. of the crude fluorinated product. Upon recrystallization from ether there is obtained pure 9α-fluoro-3β,17β-diacetoxy-11β-hydroxy-5α-androstane having a melting point of 200° C. and a specific rotation of $[α]_D^{20}$=—11° (chloroform).

*Analysis.*—C$_{23}$H$_{35}$O$_5$F molecular weight—410.5. Calculated: C, 67.3%, H, 8.6%, F, 4.6%. Found: 67.6%, 8.7%, 4.8%.

This compound is not described in the literature and, similar to the compound produced by Example 4, can be used as an intermediate in the production of 9α-fluoro-17β-hydroxy - 17α - methyl-Δ⁴-androstene-3,11-dione after saponification of the 3β and 17β acetoxy groups.

EXAMPLE 6

*Preparation of 3,20-bis-ethylene-ketal of 6β-fluoro-5α,17α-dihydroxy-pregnane-3,11,20-trione*

2.5 cc. of dimethylformamide and 2.5 cc. of anhydrous hydrofluoric acid are admixed as described in Example 1, and then 500 mgm. of 3,20-bis-ethylene-ketal-5α,6α-epoxy-17α-hydroxy-pregnane - 3,11,20 - trione having a melting point of 281° C. and a specific rotation of $[\alpha]_D^{20} = -24°$ are added. The said trione is described by Ringold (J.A.C.S., vol. 80, 1958, p. 3091). The reaction mixture is allowed to stand for 3½ hours at −5° C. during which time epoxide dissolves slowly and at the same time the fluorinated derivative crystallizes out. The reaction mixture is poured into an aqueous solution of bicarbonate and vacuum filtered. The filter cake is washed and dried, yielding crude 3,20-bis-ethylene-ketal of 6β-fluoro-5α,17α-dihydroxy-pregnane-3,11,20-trione having a melting point of 242° to 244° C. The crude product is purified by recrystallization from a 1:1 mixture of ether-ethylacetate. The purified substance has a melting point of 251°–252° C. and a specific rotation of $[\alpha]_D^{20} = -10°$ (chloroform).

*Analysis.*—$C_{25}H_{37}O_7F$; molecular weight—468.55. Calculated: F, 4.0%. Found: 4.0%.

Despite the sensitivity of the diethylene ketal toward acids, the yield is on the order of 50%.

This compound is not described in the literature and is useful as an intermediate in the synthesis of 6α-fluoro-prednisone, a well known steroid, according to the following reaction scheme:

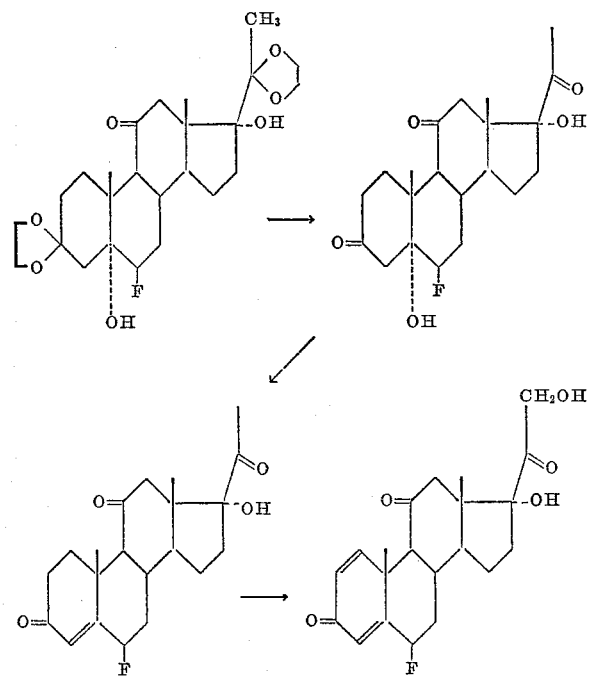

EXAMPLE 7

*Preparation of the fluorination reagent*

200 cc. of anhydrous hydrofluoric acid are introduced while stirring and over a period of the order of 30 to 40 minutes into 150 cc. of dimethylformamide heated to a temperature of 45 to 50° C. while maintaining the internal temperature between 45 and 55° C. The solution thus obtained is then cooled to a temperature between 0 and 2° C.

EXAMPLE 8

*Preparation of 21-acetoxy-9α-fluoro-11β,17α-dihydroxy-16α-methyl-Δ¹,⁴-pregnadiene-3,20-dione*

50 gm. of 9β,11β-epoxy-17α-hydroxy-21-acetoxy-16α-methyl-Δ¹,⁴-pregnadiene-3,20-dione are introduced in small portions and while stirring into the cooled solution obtained by Example 7 above. After the introduction is terminated, a violet-pink solution is obtained which is maintained under agitation and between 0 and +2° C. for 90 minutes. Thereafter, the reaction mixture is slowly poured into a mixture consisting of 1 liter of 22° Bé ammonia and 5 kg. of ice.

In the course of this operation the temperature rises but it should not exceed 10° C. The mixture is vacuum filtered and is washed with water and dried, yielding 51 gm. of the raw product. After treatment with animal charcoal and recrystallization from methylethylketone, 38 gm. of 21-acetoxy-9α-fluoro-11β,17α-dihydroxy-16α-methyl-Δ¹,⁴-pregnadiene-3,20-dione are obtained.

While we have given certain specific embodiments of our invention, we wish it to be understood that various changes and modifications may be made therein without departing from the spirit of the invention or the scope of the appended claims.

We claim:

1. In a process for converting a steroid selected from the group consisting of 9β,11β-epoxy saturated and unsaturated steroids of the pregnane and androstane series and 5α,6α-epoxy saturated and unsaturated steroids of the pregnane and androstane series to corresponding steroids of the class consisting of 9α-fluoro-11β-hydroxy and 6β-fluoro-5α-hydroxy saturated and unsaturated steroids of the pregnane and androstane series by reacting the epoxy steroids with hydrofluoric acid, the improvement which consists in conducting the reaction with about equal volumes of liquefied anhydrous hydrofluoric acid and dimethylformamide at temperatures between about −10° C. to +10° C.

2. The process of claim 1 in which the steroid reactant is 9β,11β-epoxy-17α-21-dihydroxy-Δ¹,⁴-pregnadiene-3,20-dione.

3. The process of claim 1 in which the steroid reactant is 9β,11β-epoxy-17α-hydroxy-16α-methyl-Δ¹,⁴-pregnadiene-3,20-dione.

4. The process of claim 1 in which the steroid reactant is 9β,11β-epoxy-17α-hydroxy-21-acetoxy-16α - methyl-Δ¹,⁴-pregnadiene-3,20-dione.

5. The process of claim 1 in which the steroid reactant is the 3,20-bis-ethylene-ketal of 5α,6α-epoxy-17α-hydroxy-pregnane-3,11,20-trione.

6. The process of preparing a stable fluorination mixture which comprises slowly adding about an equal volume of anhydrous hydrofluoric acid to dimethyl formamide while maintaining the temperature between about 40° C. and about 60° C.

7. A stable fluorination mixture consisting of about equal volume amounts of anhydrous hydrofluoric acid and dimethyl formamide.

References Cited in the file of this patent

UNITED STATES PATENTS

| | | |
|---|---|---|
| 2,813,881 | Herr | Nov. 19, 1957 |
| 2,838,490 | Badcock et al. | June 10, 1958 |
| 2,838,501 | Campbell et al. | June 10, 1958 |
| 2,894,007 | Graber et al. | July 7, 1959 |
| 2,918,434 | Gall et al. | Dec. 22, 1959 |